(12) United States Patent
Meijer

(10) Patent No.: US 9,460,189 B2
(45) Date of Patent: Oct. 4, 2016

(54) DATA MODEL DUALIZATION

(75) Inventor: Henricus Johannes Maria Meijer, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 12/888,918

(22) Filed: Sep. 23, 2010

(65) Prior Publication Data
US 2012/0078974 A1 Mar. 29, 2012

(51) Int. Cl.
*G06F 7/00* (2006.01)
*G06F 17/00* (2006.01)
*G06F 17/30* (2006.01)

(52) U.S. Cl.
CPC ... *G06F 17/30595* (2013.01); *G06F 17/30294* (2013.01); *G06F 17/30917* (2013.01)

(58) Field of Classification Search
USPC .......................... 717/140; 705/7.11; 709/246
See application file for complete search history.

(56) References Cited

U.S. PATENT DOCUMENTS

| | | | |
|---|---|---|---|
| 5,956,707 A | 9/1999 | Chu | |
| 6,820,135 B1* | 11/2004 | Dingman et al. | 709/246 |
| 6,879,946 B2* | 4/2005 | Rong et al. | 703/2 |
| 7,013,289 B2* | 3/2006 | Horn | G06Q 10/087 705/14.51 |
| 7,159,185 B1* | 1/2007 | Vedula et al. | 715/763 |
| 7,555,709 B2* | 6/2009 | Kuznetsov et al. | 715/234 |
| 7,580,941 B2* | 8/2009 | Narasayya et al. | |
| 7,680,767 B2 | 3/2010 | Adya et al. | |
| 7,680,817 B2* | 3/2010 | Audet et al. | 707/999.102 |
| 7,937,281 B2* | 5/2011 | Miller et al. | 705/7.11 |
| 8,135,718 B1* | 3/2012 | Das | G06F 17/30979 707/748 |
| 8,316,306 B2* | 11/2012 | Audet | 715/736 |
| 8,572,236 B2* | 10/2013 | Sherb et al. | 709/224 |
| 2003/0014397 A1 | 1/2003 | Chau et al. | |
| 2003/0069908 A1* | 4/2003 | Anthony | G06F 17/30569 715/251 |
| 2003/0172368 A1* | 9/2003 | Alumbaugh et al. | 717/106 |
| 2004/0205562 A1 | 10/2004 | Rozek et al. | |
| 2005/0050068 A1 | 3/2005 | Vaschillo et al. | |
| 2005/0149555 A1* | 7/2005 | Wang et al. | 707/103 R |
| 2005/0171966 A1 | 8/2005 | Rath et al. | |
| 2006/0047780 A1* | 3/2006 | Patnude | 709/219 |
| 2006/0101423 A1 | 5/2006 | Aharoni et al. | |
| 2006/0173804 A1 | 8/2006 | Desai et al. | |
| 2007/0185591 A1 | 8/2007 | Frei et al. | |

(Continued)

FOREIGN PATENT DOCUMENTS

| | | |
|---|---|---|
| JP | 10307742 A | 11/1998 |
| JP | 2000112795 A | 4/2000 |

(Continued)

OTHER PUBLICATIONS

Zyp, Kris, "NoSQL Architecture—SitePen Blog", Retrieved at << http://www.sitepen.com/blog/2010/05/11/nosql-architecture/ >>, May 11, 2010, pp. 11.

(Continued)

*Primary Examiner* — Susan Chen
(74) *Attorney, Agent, or Firm* — Nicholas Chen; Kate Drakos; Micky Minhas

(57) ABSTRACT

A data model can be generated by dualizing another data model. In other words, a first data model can be transformed into a second data model, wherein the second data model is a mathematical dual of the first data model. For example, a non-relational data model can be generated by dualizing a relational data model.

13 Claims, 9 Drawing Sheets

(56) References Cited

U.S. PATENT DOCUMENTS

| | | | |
|---|---|---|---|
| 2009/0106282 A1 | 4/2009 | Silverman | |
| 2010/0145946 A1 | 6/2010 | Conrad et al. | |
| 2010/0205586 A1* | 8/2010 | Mun .................. | G06F 8/44 717/140 |
| 2012/0158633 A1* | 6/2012 | Eder .................. | G06F 19/3437 706/46 |

FOREIGN PATENT DOCUMENTS

| | | |
|---|---|---|
| JP | 2010152748 A | 7/2010 |
| TW | 200813750 A | 3/2008 |
| WO | 2009147185 A1 | 12/2009 |

OTHER PUBLICATIONS

"Venu Anuganti Blog—CAP Theorem, Eventual Consistency, NoSQL", Retrieved at << http://venublog.com/2010/04/07/cap-theorem-eventual-consistency-nosql/ >>, Apr. 7, 2010, pp. 4.

"LINQ 2010—DevelopMentor", Retrieved at << http://browse.develop.com/2010/linq/ >>, Aug. 5, 2010, pp. 6.

Leavitt, Neal, "Will NoSQL Databases Live Up to Their Promise?", Retrieved at << http://www.leavcom.com/pdf/NoSQL.pdf >>, vol. 43, No. 2, Feb. 2010, p. 12-14.

"Cooperative Database Systems", Retrieved at << http://www.cobase.cs.ucla.edu/tech-docs/cobase.pdf >>, Editor: Benjamin Wah, p. 1-15.

Zhang, et al., "Query Formulation from High-level Concepts for Relational Databases", Retrieved at << http://cobase-www.cs.ucla.edu/tech-docs/uidis99.pdf >>, Proceedings of the User Interfaces to Data Intensive Systems, Sep. 5-6, 1999, pp. 11.

"Search Y Combinator—NoSQL", Retrieved at << http://searchyc.com/nosql?page=79&sort=by_date >>, Aug. 5, 2010, pp. 3.

Hurst, Nathan, "Visual Guide to NoSQL Systems", Retrieved at << http://blog.nahurst.com/visual-guide-to-nosql-systems >>, Mar. 15, 2010, pp. 7.

Bunch, et al., "An Evaluation of Distributed Datastores Using the AppScale Cloud Platform", Retrieved at << http://www.cs.ucsb.edu/~ckrintz/papers/cloud10.pdf >>, 2010 IEEE 3rd International Conference on Cloud Computing, Jul. 5-10, pp. 8.

Cárdenas, Christian, "Parsing and Preprocessing of RLXQuery for XML Query Relaxation", Retrieved at << http://www.cobase.cs.ucla.edu/projects/coxml/doc/chris_comp_exam.pdf >>, 2004, pp. 34.

"International Search Report", Mailed Date: Apr. 9, 2012, Application No. PCT/US2011/050578, Filed Date: Sep. 6, 2011, pp. 8.

"Office Action and Search Report Issued in Taiwan Patent Application No. 100128900", Mailed Date: Jun. 16, 2015, 8 Pages.

"Supplementary Search Report Received for European Patent Application No. 11827187.3", Mailed Date: Dec. 11, 2014, 8 Pages.

"Third Office Action Received for Chinese Patent Application No. 201110296894.X", Mailed Date: Dec. 26, 2014, 8 Pages.

"First Office Action and Search Report Issued in Chinese Patent Application No. 201110296894.X", Mailed Date: Jan. 15, 2014, 11 Pages.

"Second Office Action Issued in Chinese Patent Application No. 201110296894.X", Mailed Date: Jun. 30, 2014, 8 Pages.

"Office Action Issued in Australia Patent Application No. 2011305918", Mailed Date: Apr. 10, 2014, 4 Pages.

"Office Action Issued in Australia Patent Application No. 2011305918", Mailed Date: Aug. 14, 2014, 4 Pages.

"Office Action Issued in Australia Patent Application No. 2011305918", Mailed Date: Jun. 13, 2014, 5 Pages.

Garcia-Molina, et al., "Chapter 11—Data Storage", In Book—Database Systems: The Complete Book, Jan. 1, 2002, pp. 503-566.

"Fourth Office Action Issued in Chinese Patent Application No. 201110296894.X", Mailed Date: Jun. 15, 2015, 6 Pages.

"Office Action Issued in Taiwan Application No. 100128900", Mailed Date: Oct. 2, 2015, 8 Pages.

"Office Action Issued in Japanese Application No. 2013-530166", Mailed Date: Aug. 31, 2015, 6 Pages.

* cited by examiner

PRODUCT TABLE (310)

| ID | TITLE | AUTHOR | YEAR | PAGES |
|---|---|---|---|---|
| 1579124585 | THE RIGHT STUFF | TOM WOLF | 1979 | 304 |

RATING TABLE (320)

| ID | RATING | PRODUCT ID |
|---|---|---|
| 787 | ***** | 1579124585 |
| 747 | 4 STARS | 1579124585 |

KEYWORD TABLE (330)

| ID | KEYWORD | PRODUCT ID |
|---|---|---|
| 4711 | BOOK | 1579124585 |
| 1843 | HARDCOVER | 1579124585 |
| 2012 | AMERICAN | 1579124585 |

FIG. 3

DATA MODEL DUALIZATION

BACKGROUND

A data model describes how data can be stored and accessed. More formally, data models define data entities and relationships between the data entities. The primary objective of a data model is to provide a definition and format of data to facilitate management and processing of large quantities of data. One application of data models is database models, which define how a database or other store is structured and utilized. A database model can be relational or non-relational.

In a relational model, or more particularly a relational database, data is structured in terms of one or more tables. Tables are relations that comprise a number of columns and rows, wherein the named columns are referred to as attributes and rows capture data for specific entity instances. For example, a table can capture information about a particular entity such as a book in rows, also called tuples, and columns. The columns identify various attributes of an entity such as the title, author, and year of publication of a book. The rows capture an instance of an entity such as a particular book. In other words, each row in the table represents attributes of a particular book. Further yet, a table can include primary and foreign keys that enable two or more tables to be linked together.

Amongst many implementations a non-relational model, a key-value model is one of the most popular. Key-value databases or stores represent a simple data model that maps unique keys to a set of one or more values. More specifically, the key-value store stores values and an index to facilitate location of the stored values based on a key. For example, a key be located that identifies one of a title, author, or publication of a data of a book.

Relational databases are often referred to as SQL databases while some non-relational databases are called NoSQL databases or stores. SQL stands for Structured Query Language, which is the primary language utilized to query and update data in a relational database. When SQL is utilized in conjunction with a relational database, the database can be referred to as a SQL-based relational database. However, more often a SQL-based relational database is simply referred to as a SQL database and used as a synonym for a relational database. NoSQL is a term utilized to designate databases that differ from SQL-based relational databases. In other words, the term NoSQL is used as a synonym for a non-relational database or store such as but not limited to a key-value store.

SQL databases and NoSQL stores have a number of advantages and disadvantages that are captured at a high level by the CAP theorem, which states that of consistency (C), availability (A), and partition tolerance (P) only two can be guaranteed at any one time. Consistency refers to a characteristic of a system to remain in a consistent state after an operation such as an update. Availability concerns remaining operational over a period of time, even with the presence of failures, and partition tolerance refers to the ability of a system to operate across network partitions. Typically, the design choice for SQL databases is to choose consistency and availability over partition tolerance, and for NoSQL stores to drop consistency in favor or partition tolerance and availability. In other words, NoSQL stores sacrifice consistency for scalability or alternatively SQL databases sacrifice scalability for consistency.

With continued emergence of network-based or "Cloud" computing, NoSQL stores have received a lot of attention recently at least because of their scalability. At the same time, some in the industry have expressed concern as to the future of SQL databases in this and other contexts.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure generally pertains to data model dualization. Given a first data model, a second data model can be produced that is a mathematical dual of the first data model. Accordingly, if the dual second data model were itself dualized, then the first data model would be returned. By way of example and not limitation, from a relational data model, a dual non-relational data model can be generated. More specifically, a key-value data model can be generated, which consequently shows that the NoSQL data model is a dual of the SQL model.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

BRIEF DESCRIPTION OF THE DRAWINGS

FIG. 3 depicts an exemplary relational representation.

DETAILED DESCRIPTION

Details below are generally directed toward data model dualization. A data model can be generated by dualizing another data model. In other words, a first data model can be transformed into a second data model, wherein the second data model is a mathematical dual of the first data model. For example, from a relational data model, a non-relational data model, such as a key-value store, can be produced consequently proving that a NoSQL data model is a dual of the SQL data model.

The term "dual" and various forms thereof as used herein are intended to refer to mathematical duality as it pertains to category theory, or in other words categorical duality. More specifically, duality is a correspondence between properties of a category "C" and dual properties of the opposite category "C^op." Given a statement regarding the category "C," by interchanging the source and the target of each morphism (e.g., mapping) as well as interchanging the order of composing two morphisms, a corresponding dual statement can be obtained regarding the opposite category "C^op." For example, the category "C" can corresponds to a data model and the opposite category "C^op" can refer to a dual- or co-data model. "Dualizing" refers to the act of generating a categorical dual from a data model, for example.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
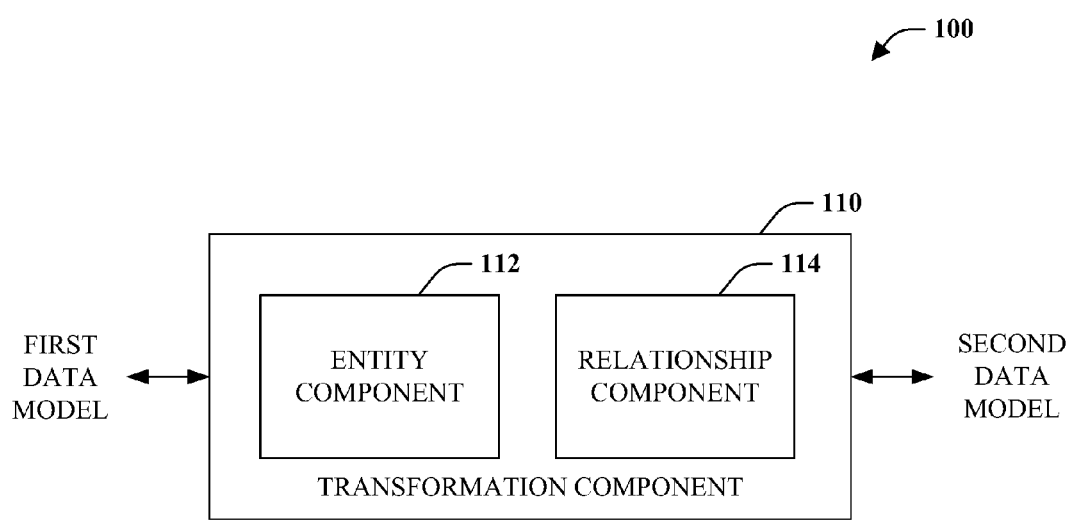
FIG. 1 is a block diagram of a data modeling system.

Referring initially to FIG. 1, a data modeling system 100 is illustrated. The data modeling system 100 includes a transformation component 110 that receives retrieves or otherwise obtains or acquires a first data model and generates a second database model by dualizing the first data model. Stated differently, the second data model is a mathematical dual of the first data model. Further, the transformation component 110 can receive, retrieve or otherwise obtain or acquire a second data model, which is a dual of the first data model, and transform the second data model back into the first data model by dualizing the second data model. As a result, of this relationship, the first data model can simply be referred to as a data model and the second data model can be referred to as a dual- or co-data model. Hence, moving from left to right the transformation component 110 transforms a data model (D) into a co-data model (co(D)), or in other words generate a co-data model (co(D)) as a function of the data model (D). Moving from right to left, the transformation component 110 transforms a co-data model (co(D)) into a data model (e.g. co(co(D))->D), or in other words produces the data model (D) as a function of the co-data model (co(D))

The transformation component 110 includes an entity component 112 and a relationship component 114. A data model comprises a set of entities and relationships, or in other words associations, between entities. The entity component 112 is configured to generate a dual- or co-entity, for example, from an entity of the first data model. Similarly, the relationship component 114 can derive dual- or co-relationships from relationships specified in the first data model, for example. In addition, the relationship component 114 can generate dual compositions of relationships, or associations, from those of a first data model, for instance.

Figure 2:
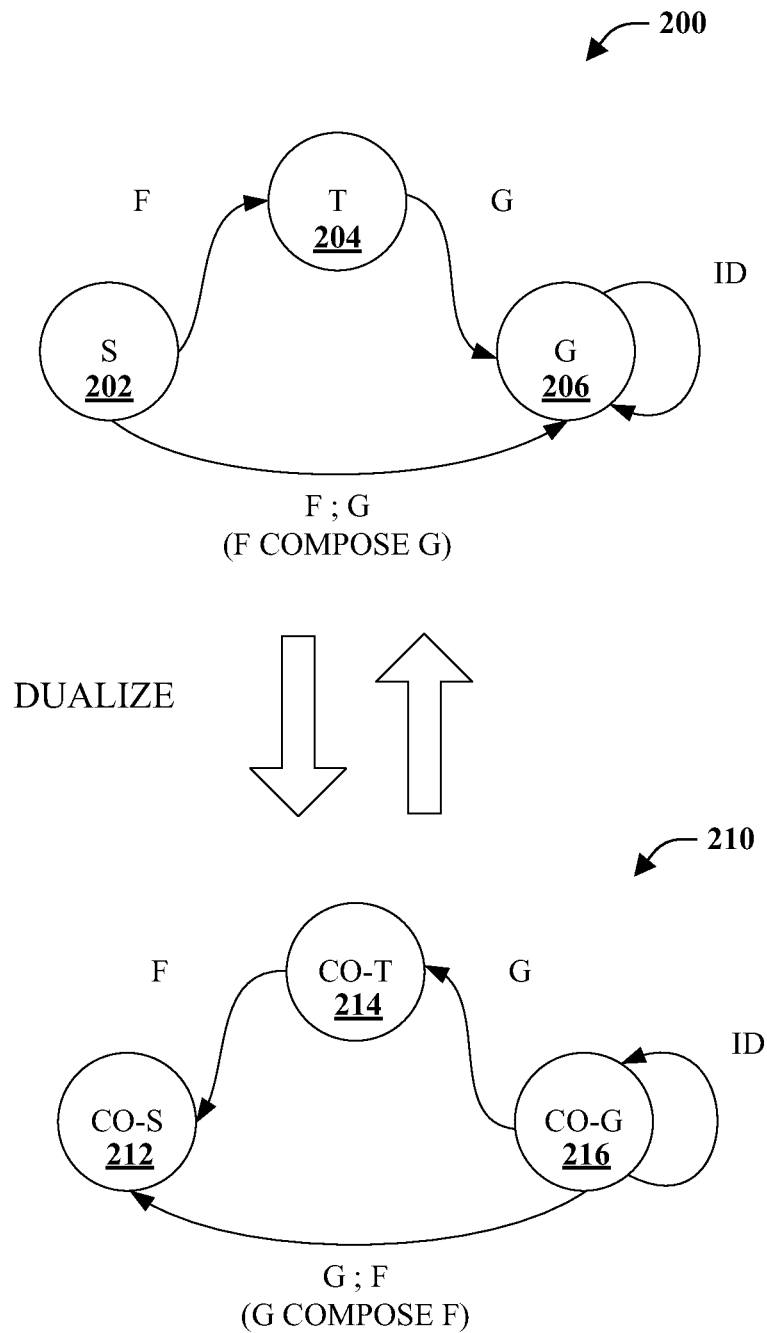
FIG. 2 illustrates an abstract transformation between data models.

FIG. 2 illustrates an abstract transformation between two data models to facilitate clarity and understanding. More particularly, from a first data model 200, a second data model 210 can result and vice versa. The first data model includes three entities "S" 202, "T" 204, and "G" 206. Relationships between the entities are shown as arrows. More specifically, a relationship "F" goes from "S" 202 to "T" 204, and a relationship "G" goes from "T" 202 to "G" 206. "G" also includes an identity relationship "ID" that starts from "G" 206 and returns to "G" 206. Additionally, a composition relationship "F;G" (F compose G) exists between "S" 202 and "G" 206. To dualize the first data model 200, opposite entities are identified and the relationships, or more formally morphisms, between opposite entities are reversed. As shown, the second data model 210 includes "CO-S" 212, "CO-T" 214, and "CO-G" 216 entities. Further, the arrows representing the morphisms are reversed, representing a change in the source and target of morphisms. For example, the composition relationship of the first data model 200, "F;G" (F compose G) becomes "G;F" (G compose F) in the second data model 210. As a true dual, if the second data model 210 is dualized, the result is the first data model 200.

The following is high-level discussion of an exemplary transformation process that can be carried out by the transformation component 110 of FIG. 1. Here, the dual is derived for a relational database. In other words, the first data model is a relational model. As will be shown, the result, or second data model, can be a non-relational model or more specifically a key-value model.

FIG. 3 illustrates an exemplary relational representation 300 for storing product information. As shown, there are three tables linked together by primary and foreign keys. Product table 310 provides primary key "ID" 312 as well as other columns for product information such as title, author, year of publication, and total number of pages. Rating table 320 provides product rating information and a foreign key "PRODUCT ID" 322 referencing the sole record of product table 310. Similarly, keyword table 330 provides keywords associated with a product and includes a foreign key "PRODUCT ID" 332 that refers back to the corresponding record of product table 310.

Figure 4:
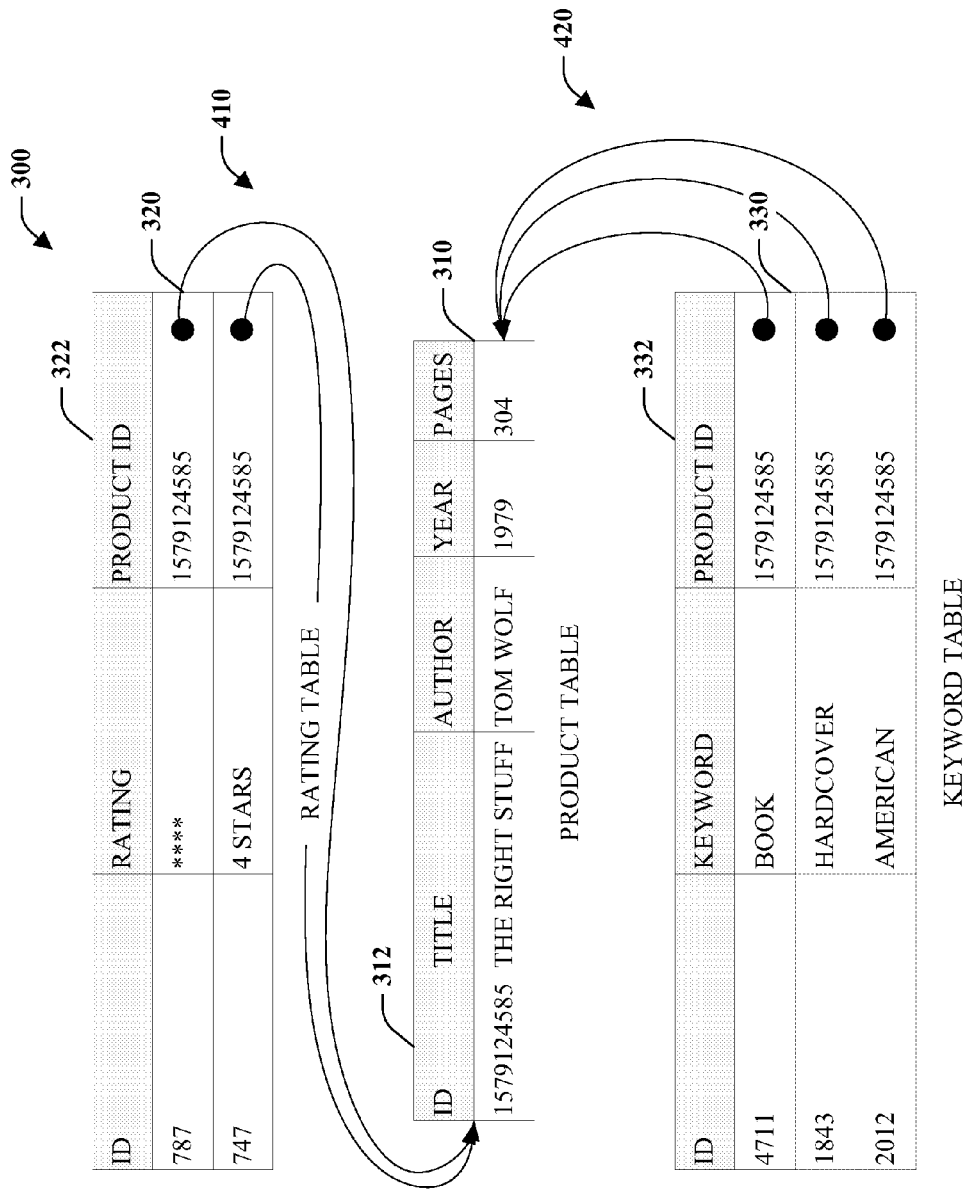
FIG. 4 illustrates an exemplary relation representation including pointers between tables.

Turning briefly to FIG. 4 the exemplary relational representation 300 of FIG. 3 is illustrated with pointers inserted between foreign keys and primary keys. In particular, pointers 410 point from the foreign key "PRODUCTS ID" 322 of ranking table 320 to the corresponding record identified by the primary key "ID" 312 of the product table 310. Similarly, pointers 420 point from the foreign key "PRODUCTS ID" 332 of the keyword table 330 to the corresponding record identified by the primary key "ID" 312 of the product table 310.

Figure 5:
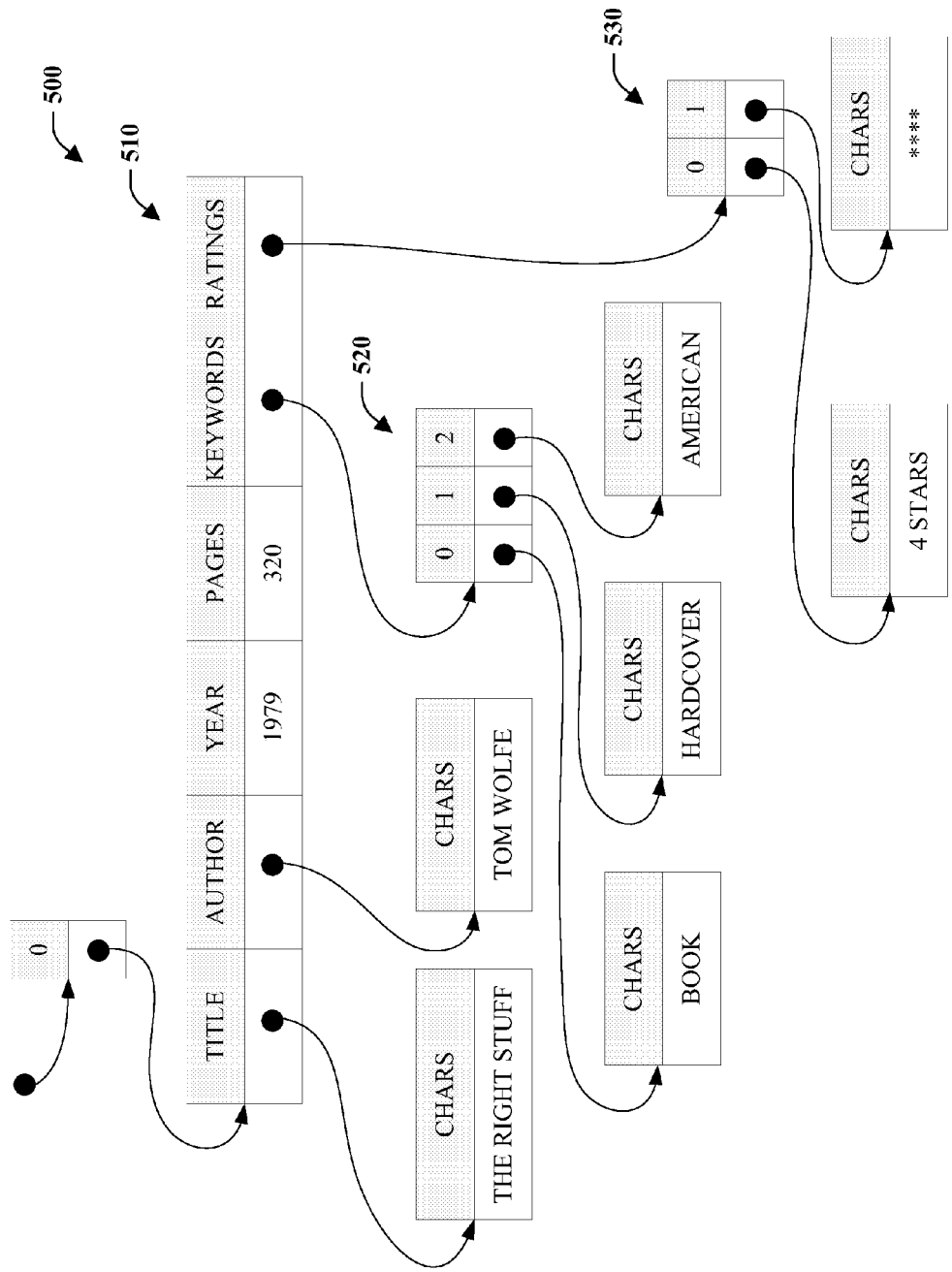
FIG. 5 illustrates an exemplary non-relational key-value representation.

FIG. 5 illustrates an exemplary non-relational key-value representation 500 of the same data provided with respect the exemplary relational representations of FIGS. 3 and 4. Here, rows such as 510, 520, and 530 can store either keys, shown as pointers to values, or scalar values. For instance, row 510 can include keys for title, author, keywords, and ratings and scalar values for year of publication and total number of pages. Row 520 includes three keys that map to three keywords, and row 530 includes two keys that map to two ratings representations.

Figure 6:
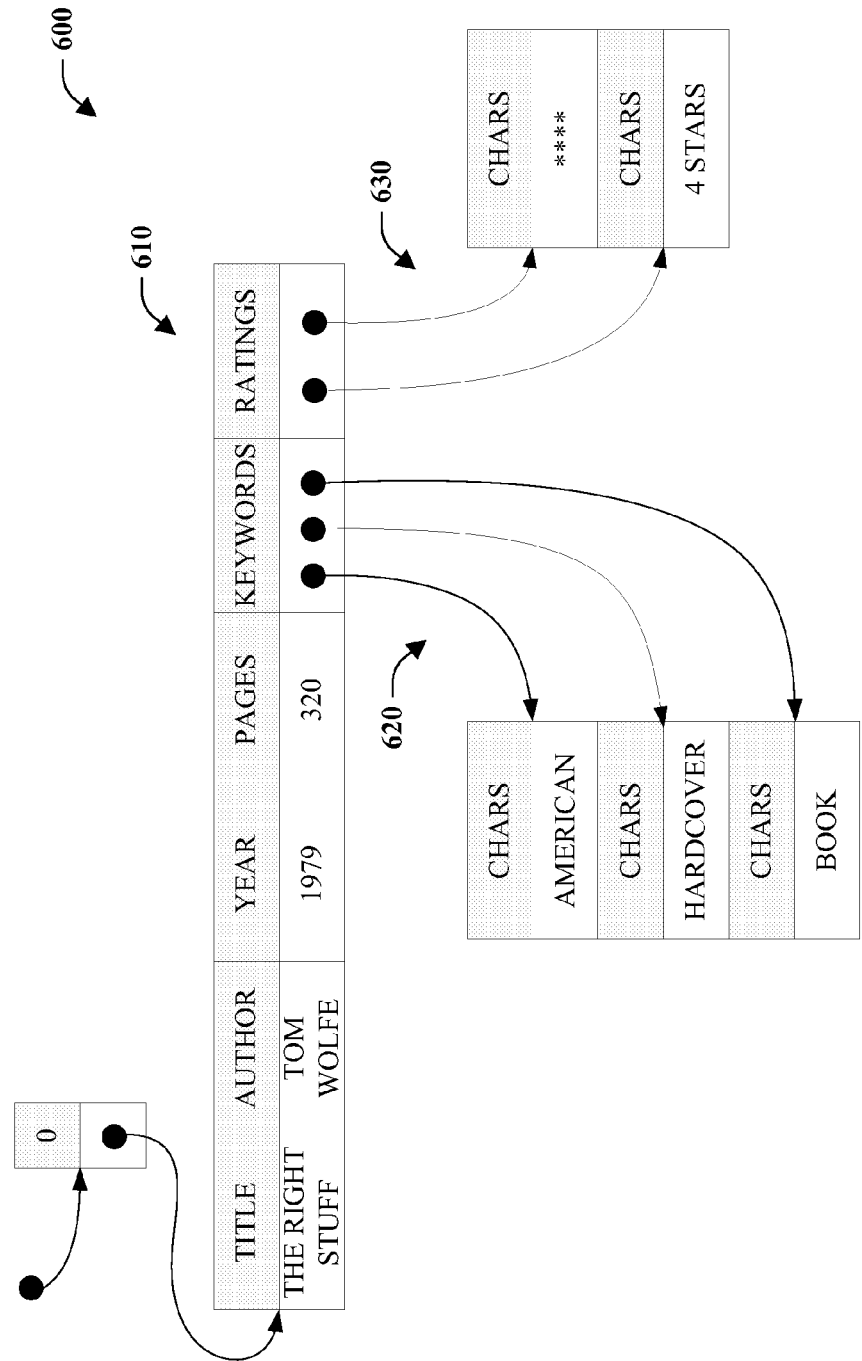
FIG. 6 depicts a generalized key-value representation.

Referring to FIG. 6, an exemplary non-relational key-value representation 600 is depicted. Here, however, rather than allowing rows to include only scalars and keys, the restriction is relaxed to allow various types of data. Row 610, corresponding to previous row 510 of FIG. 5, now includes values for title and author and a collection of keys for both keywords and ratings 620 and 630, respectively. More specifically, keys 620 point to keywords and keys 630 point to rating information.

Compare the exemplary relational representation of FIG. 4 with the exemplary non-relational representation of FIG. 6. Notice that the main distinguishing feature is that the arrows are reversed. More particularly, relational arrows go from a row with a foreign key to a row with a corresponding primary key and non-relational arrows go from a row to a location where data is stored. In other words, in a relational context children point to their parents and in a non-relational context a parents points to their children. What has been shown here is that a non-relational key-value data model is the dual of a relational primary-foreign key data model. Consequently, the NoSQL data model is a mathematical dual of the SQL data model.

More formally, in a relational data model entities (e) can be defined as follows: "∀e" in table, e·k≠e'·k," where columns are scalars. For morphisms, "$e_1^F \rightarrow e_2$" and "$e_1 \cdot F_{fk} = e_2 \cdot F_{pk}$." In the non-relational data model context, entities (e) can be defined as: "∃k" in domain(Lookup), "Lookup[k]=v," and morphisms are defined as "$e_1 \leftarrow e_2$," Lookup[$e_2$·k]=$e_1$." Furthermore, for compositions of relationships or associations, the order is reversed as follows: "co(F;G)=co(G); co(F)." More simply, words in the relational model entities are rows that have a unique primary key, and two entities "$e_1$" and "$e_2$" that are related if there is a direct or indirect primary/foreign-key relationship between "$e_1$" and "$e_2$." In the non-relational or key-value model, entities are values that can be found via their key in the store, and two entities "$e_1$" and "$e_2$" are related if there they are directly or indirectly linked via pointers through the store.

There are many consequences of duality. In particular, if a statement "T" is true in "C," then its dual "co(T)" is true in "co(C)." With respect to relational or SQL data models and non-relational or NoSQL data models some of the consequences are summarized in TABLE 1 below.

TABLE 1

| Relational | Non-relational (key-value) |
|---|---|
| Children point to parents | Parents point to children |
| Entities have identity (extensional) | Environment determines identity (intensional) |
| Environment coordinates changes (transactions) | Entities responsibility to react to changes (eventually consistent) |
| Closed world | Open world |
| Not scalable | Scalable |
| Not compositional | Compositional |

Furthermore, SQL and NoSQL data models are not in conflict like good and evil as some suggest. Rather, the two data models are opposites that can co-exist in harmony and that can be transformed into each other.

Moreover, it is significant that a formalization of the NoSQL data model has been discovered. Prior to the formalization of the SQL data model work was being done with respect to what can loosely be called relational data models but there were a number of ad hoc implementations and the industry was not focused on any one in particular. Fast forward to today and the situation is quite similar except now the data model is NoSQL. By formalizing NoSQL as the dual of SQL, work can now be focused on this version of the data model.

While for purposes of clarity and brevity, transformations between relational and non-relational data models have been discussed in detail. However, the claimed subject matter is not limited thereto. Rather, the intent is to cover any and all data models that result from dualization. By way of example and not limitation, a structured data model can be transformed into, or generate, an unstructured data model or vice versa. For instance, the transformation component 110 of FIG. 1 can receive as input an XML (eXtensible Markup Language) data model and output a document data model, wherein documents or objects (data items) are indexed to perform queries expeditiously and efficiently.

Additionally, it is to be noted that the transformation component 110 of FIG. 1 can operate automatically or semi-automatically. In automatic mode, the transformation component 110 can receive a first data model and automatically output a dual second data model. Alternatively, in semi-automatic mode, the transformation component 110 can solicit input from a user to facilitate production of a dual data model. In one implementation, for example, the transformation component 110 can be a tool to aid users in data modeling with respect to dualization.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the transformation component 110 or one or more sub-components thereof can employ such mechanisms to efficiently determine or otherwise infer data model properties and dual data model features.

Figure 7:
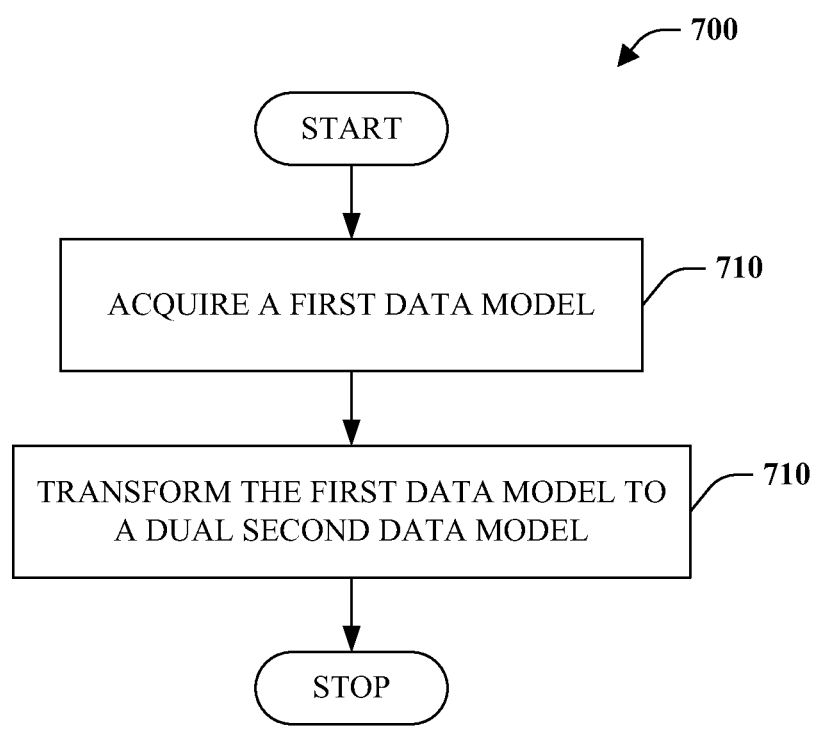
FIG. 7 is a flow chart diagram of a method of data model generation.
Figure 8:
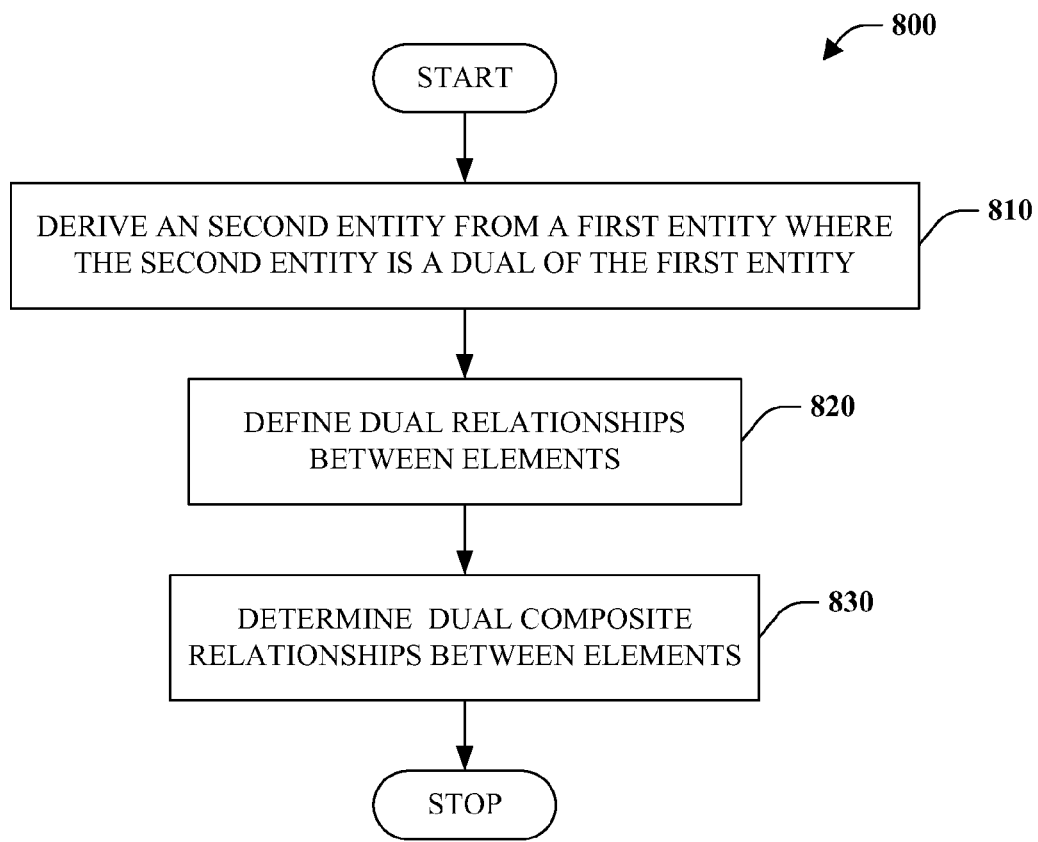
FIG. 8 is a flow chart diagram of a method dualizing a data model.

In view of the exemplary systems described supra, methodologies that may be implemented in accordance with the disclosed subject matter will be better appreciated with reference to the flow charts of FIGS. 7 and 8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 7, a method of data model generation 700 is illustrated. At reference numeral 710, a first data model is received, retrieved, or otherwise obtained or acquired. At numeral 720, the first data model is transformed into, or in other words used to generate, a dual second data model. By way of example and not limitation, a first relational data model including primary and foreign keys can be transformed into or used to generate a non-relational key-value data model. This example shows that a known first data model can be transformed into a particular form of another known data model such that if the dual second data model is dualized itself, the first data model results. This is quite a surprising result since the two data models where thought to be antithetical at least by some in the industry. Of course, the result of data model dualization can be a completely new and previously unrecognized data model with equally surprising or unremarkable consequences.

FIG. 8 is a flow chart diagram of a method of dualizing a data model 800. At reference numeral 810, a second entity is derived from a first entity where the second entity is the dual of the first entity. At reference numeral 820, dual relationships between elements are defined for example by "reversing the arrows" (e.g., S→R to S←R). At numeral 830, dual composite relationships are determined for instance be "reversing the arrows" and reversing the order of composition (e.g., F compose G to G compose F).

As used herein, the terms "component" and "system," as well as forms thereof are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 9:
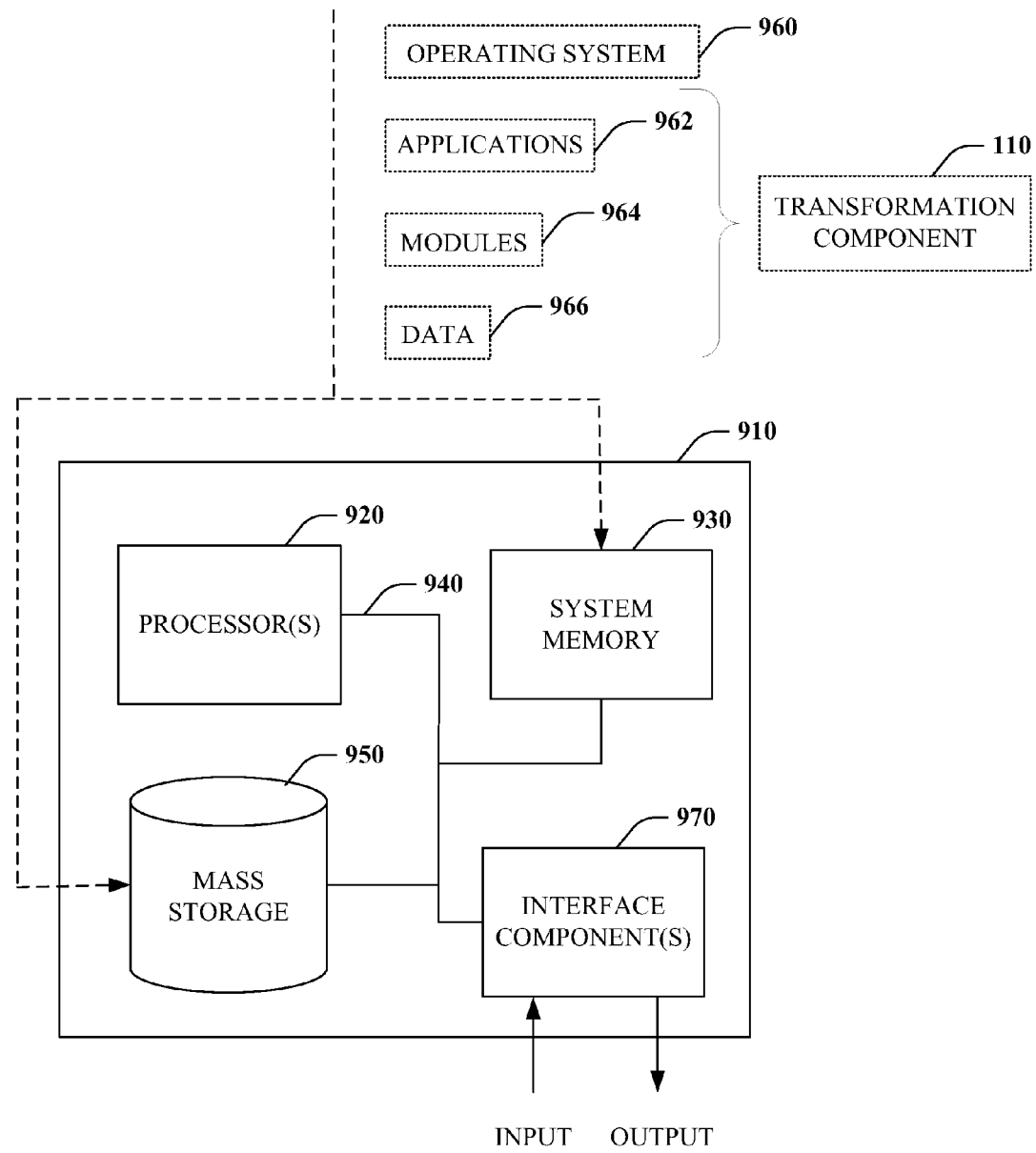
FIG. 9 is a schematic block diagram illustrating a suitable operating environment for aspects of the subject disclosure.

In order to provide a context for the claimed subject matter, FIG. 9 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 9, illustrated is an example general-purpose computer 910 or computing device (e.g., desktop, laptop, server, hand-held, programmable consumer or industrial electronics, set-top box, game system . . . ). The computer 910 includes one or more processor(s) 920, system memory 930, system bus 940, mass storage 950, and one or more interface components 970. The system bus 940 communicatively couples at least the above system components. However, it is to be appreciated that in its simplest form the computer 910 can include one or more processors 920 coupled to system memory 930 that execute various computer executable actions, instructions, and or components.

The processor(s) 920 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 920 may also be implemented as a combination of computing devices, for example a combination of a DSP and a microprocessor, a plurality of microprocessors, multi-core processors, one or more microprocessors in conjunction with a DSP core, or any other such configuration.

The computer 910 can include or otherwise interact with a variety of computer-readable media to facilitate control of the computer 910 to implement one or more aspects of the claimed subject matter. The computer-readable media can be any available media that can be accessed by the computer 910 and includes volatile and nonvolatile media and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media can include memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like medium which can be used to store the desired information and which can be accessed by the computer 910.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

System memory 930 and mass storage 950 are examples of computer-readable storage media. Depending on the exact configuration and type of computing device, system memory 930 may be volatile (e.g., RAM), non-volatile (e.g., ROM, flash memory . . . ) or some combination of the two. By way of example, the basic input/output system (BIOS), including basic routines to transfer information between elements within the computer 910, such as during start-up, can be stored in nonvolatile memory, while volatile memory can act as external cache memory to facilitate processing by the processor(s) 920, among other things.

Mass storage 950 includes removable/non-removable, volatile/non-volatile computer storage media for storage of large amounts of data relative to the system memory 930. For example, mass storage 950 includes, but is not limited to, one or more devices such as a magnetic or optical disk drive, floppy disk drive, flash memory, solid-state drive, or memory stick.

System memory 930 and mass storage 950 can include, or have stored therein, operating system 960, one or more applications 962, one or more program modules 964, and data 966. The operating system 960 acts to control and allocate resources of the computer 910. Applications 962 include one or both of system and application software and can exploit management of resources by the operating system 960 through program modules 964 and data 966 stored in system memory 930 and/or mass storage 950 to perform one or more actions. Accordingly, applications 962 can turn a general-purpose computer 910 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the transformation component 110 can be, or form part, of an application 962, and include one or more modules 964 and data 966 stored in memory and/or mass storage 950 whose functionality can be realized when executed by one or more processor(s) 920, as shown.

The computer 910 also includes one or more interface components 970 that are communicatively coupled to the system bus 940 and facilitate interaction with the computer 910. By way of example, the interface component 970 can be a port (e.g., serial, parallel, PCMCIA, USB, FireWire . . . ) or an interface card (e.g., sound, video . . . ) or the like. In one example implementation, the interface component 970 can be embodied as a user input/output interface to enable a user to enter commands and information into the computer 910 through one or more input devices (e.g., pointing device such as a mouse, trackball, stylus, touch pad, keyboard, microphone, joystick, game pad, satellite dish, scanner, camera, other computer . . . ). In another example implementation, the interface component 970 can be embodied as an output peripheral interface to supply output to displays (e.g., CRT, LCD, plasma . . . ), speakers, printers, and/or other computers, among other things. Still further yet, the interface component 970 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method, comprising:
   employing at least one processor configured to execute computer-executable instructions stored in memory to perform the following acts:
   receiving a first data model;
   identifying objects and morphisms of the first data model, wherein the objects are uniquely identifiable entities that capture data and the morphisms are relationships between the entities;
   generating a second data model that is a categorical dual of the first data model by interchanging source and target objects of one or more morphisms of the first data model and interchanging order of composite morphisms of the first data model, wherein the second data model is a different version of the first data model that formalizes a non-relational data model as the categorical dual of a relational data model; and
   initiating creation of a database from the second data model.

2. The method of claim 1, further comprises transforming the second data model into the first data model by dualizing the second data model.

3. The method of claim 1, comprises generating a key-value model from the relational data model.

4. The method of claim 1, comprises generating a relational data model from a non-relational data model.

5. The method of claim 1, comprises generating an unstructured data model from a structured data model.

6. A system, comprising:
   a physical processor coupled to a memory device, the processor configured to execute the following computer-executable components stored in the memory device:
   a first component that receives a first data model;
   a second component that transforms the first data model into a second data model that is a categorical dual of the first data model, wherein the second component interchanges source and target objects of one or more morphisms and order of any existing composite morphisms of the first data model to produce the second data model, wherein the second data model is a different version of the first data model that formalizes a non-relational data model as the categorical dual of a relational data model; and a third component that creates a database organized in accordance with the second data model.

7. The system of claim 6, the first data model is a structured data model.

8. The system of claim 6, the second data model is an unstructured data model.

9. The system of claim 6, the second data model is a key-value data model.

10. The system of claim 6, the second data model is a document data model.

11. The system of claim 6, the second component operates semi-automatically as a tool to aid a user in generating the dual of the first data model.

12. A computer-readable storage medium, excluding signals, having instructions stored thereon that enable at least one processor to execute a method, comprising:

receiving, by a processor, a first database model;

identifying objects and morphisms of the first database model, wherein the objects are uniquely identifiable entities that capture data and the morphisms are relationships between the entities;

generating a second database model that is a categorical dual of the first database model by interchanging source and target objects of one or more morphisms of the first database model and interchanging order of composite morphisms of the first database model, wherein the second database model is a different version of the first database model that formalizes a non-relational database model as the categorical dual of a relational database model; and initiating creation of a database structured in accordance with the second database model.

13. The computer-readable storage medium of claim 12, the method further comprises creating a key-value database model.

* * * * *